July 31, 1951  J. J. DOWNEY  2,562,302
ALL WEATHER WINDSHIELD WIPER
Filed March 13, 1946

INVENTOR.
JAMES J. DOWNEY

BY Victor J. Evans & Co.

ATTORNEYS

Patented July 31, 1951

2,562,302

UNITED STATES PATENT OFFICE 2,562,302

ALL-WEATHER WINDSHIELD WIPER

James J. Downey, Norwood, Mass.

Application March 13, 1946, Serial No. 654,078

2 Claims. (Cl. 15—250.4)

1

The invention relates to a windshield wiper, and more especially to a dual all-weather windshield wiper.

The primary object of the invention is the provision of a wiper of this character, wherein by arresting a portion of the exhaust gases near the motor of an automobile, and sending the intense heat therefrom directly to the windshield glass the latter can be cleared of the weather elements with dispatch, and during the working of the wiper, thereby giving the driver of the automobile all possible protection under all prevailing atmospheric conditions.

Another object of the invention is the provision of a wiper of this character, wherein the construction thereof is novel and the parts of the same assembled in a unique manner, the wiper being applicable to all types of vehicles or the like, either land or air travel.

A further object of the invention is the provision of a wiper of this character, which is simple in construction, thoroughly reliable and efficient in operation, strong, durable, readily and easily applied, automatic in the working thereof, possessed of few parts, thus economical in repairs and replacements and inexpensive to manufacture and install.

With these and other objects in view the invention consists in the features of construction, combination and arrangement of parts as will be hereinafter more fully described, illustrated in the accompanying drawing, which discloses the preferred embodiment of the invention and pointed out in the claims hereunto appended:

In the accompanying drawing.

Similar reference characters indicate corresponding parts throughout the several views in the drawing.

Figure 1:
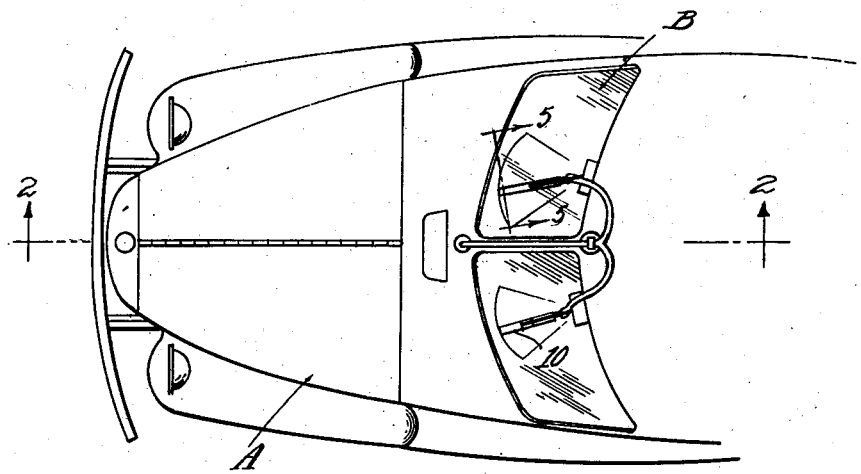
Figure 1 is a fragmentary plan view of a motor vehicle having the wiper constructed in accordance with the invention installed therewith.

Referring to the drawing in detail, A designates generally a fore part of a motor vehicle, having as usual a windshield with glass panels denoted generally at B, and operative on these is the wiper constituting the present invention and hereinafter described.

The windshield wiper constituting the present invention, comprises a wiper blade holder 10, preferably made from sheet metal or other material suitable therefor, and longitudinally thereof are fitted detachable wiper blades 11, which are disposed in spaced relation to each other and converge toward the contacting surface of glass of the windshield. The blade holder 10 is carried on a blow nozzle 12 of tubiform, which has the lateral perforations or outlets 13 for deflection by the holder in the path of travel of the blades 11 and between the same.

Figure 2:
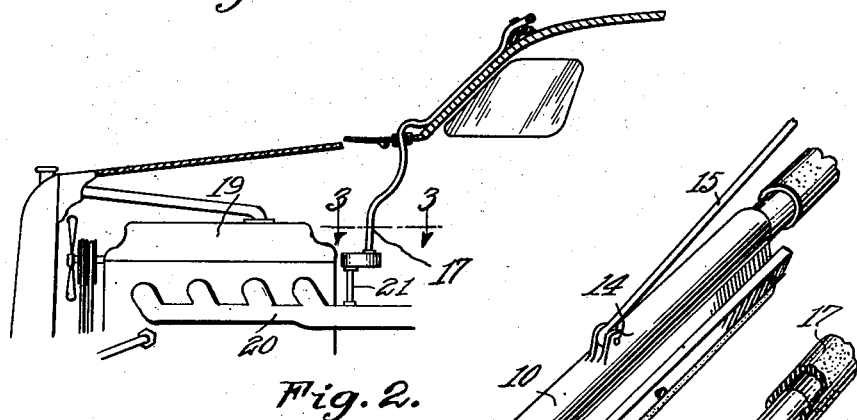
Figure 2 is a sectional view taken approximately on the line 2—2 of Figure 1 looking in the direction of the arrows.
Figures 6, 7:
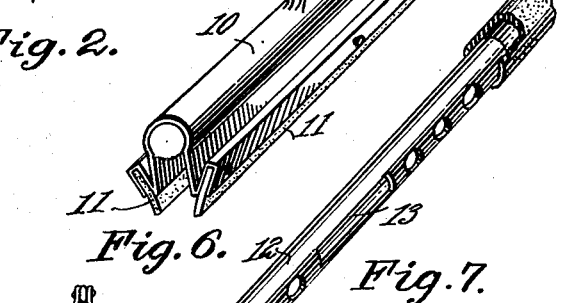
Figure 6 is a fragmentary perspective view of the wiper blade holder.
Figure 7 is a fragmentary perspective view of the air nozzle thereto.
Figure 4:
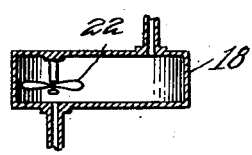
Figure 4 is a sectional view taken on the line 4—4 of Figure 3 looking in the direction of the arrows.
Figure 3:
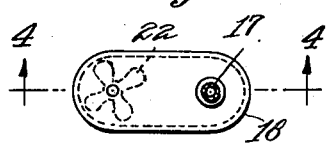
Figure 3 is a sectional view taken on the line 3—3 of Figure 2 looking in the direction of the arrows.
Figure 5:
Figure 5 is a detail sectional view taken on the line 5—5 of Figure 1 looking in the direction of the arrows.

The holder 10 is connected by a pivot 14 to a sweep arm 15, which is actuated by a selected type of actuator generally denoted at 16 and suitably mounted on the windshield, as best seen in Figures 1 and 2 of the drawing.

The nozzle 12 has a flexible hose conduit connection line 17 to an air chamber formed by a housing 18, which is located close to the motor 19 equipped with the vehicle A, and this chamber has communication with the exhaust manifold 20 of such engine, so that exhaust gases will pass into the chamber through a feed line 21 from such exhaust manifold as clearly apparent in Figure 2 of the drawing.

Within the chamber of the housing 18 confronting the line 21 from the exhaust manifold 20 is a balanced bladed fan wheel 22, which is rotated by the air or exhaust from the connection 21 for mixing and distributing the gases as they pass through the chamber to the nozzle 12 where the heated air is blasted on to the glass of the windshield for conditioning the same against all inclement weather elements and under all prevailing atmospheric conditions while driving the vehicle.

What is claimed is:

1. In a windshield wiper, the combination which comprises a tube having an elongated opening in one side thereof with spaced perforations at the ends of said elongated opening, the outer end of said tube being closed and the inner end extended to receive an air hose, a U-shaped blade holder having a closed end with legs extended therefrom frictionally mounted on said tube with the tube nested in the closed end thereof and with the said elongated opening and perforations of the tube positioned between the legs of the holder, said blade holder having inverted U-shaped flanges on the edges of the legs and said flanges positioned in converging relation, wiper blades frictionally mounted in the said U-shaped flanges and said flanges positioned whereby the wiping edges of the blades are toed inwardly, and means on the back of the closed end of the blade holder for pivotally attaching the said holder to a sweep arm of a windshield wiper, the ends of said holder being open whereby gases discharged through the said elongated opening and perforations of the tube circulate rapidly through the wiper.

2. In a windshield wiper, the combination which comprises a tube having an elongated opening in one side thereof with spaced perforations at the ends of said elongated opening, the outer end of said tube being closed and the inner end extended to receive an air hose, a U-shaped blade holder having a closed end with legs extended therefrom frictionally mounted on said tube with the tube nested in the closed end thereof and with the said elongated opening and perforations of the tube positioned between the legs of the holder, said blade holder having inverted U-shaped flanges on the edges of the legs and said flanges positioned in converging relation, wiper blades frictionally mounted in the said U-shaped flanges and said flanges positioned whereby the wiping edges of the blades are toed inwardly, means on the back of the closed end of the blade holder for pivotally attaching the said holder to a sweep arm of a windshield wiper, the ends of said holder being open whereby gases discharged through the said elongated opening and perforations of the tube circulate rapidly through the wiper, and a hose connecting the outer end of said tube to an exhaust manifold of an internal combustion engine.

JAMES J. DOWNEY.

REFERENCES CITED

The following references are of record in the file of this patent:

UNITED STATES PATENTS

| Number | Name | Date |
|---|---|---|
| 1,755,059 | Gallagher | Apr. 15, 1930 |
| 1,801,373 | Stevens | Apr. 21, 1931 |
| 1,857,042 | Colley | May 3, 1932 |